United States Patent
Hung et al.

(10) Patent No.: US 11,260,804 B2
(45) Date of Patent: Mar. 1, 2022

(54) BLIND-SPOT IMAGE DEVICE WITH ADJUSTMENT RINGS

(71) Applicant: Alpha Networks Inc., Hsinchu (TW)

(72) Inventors: Jie De Hung, Hsinchu (TW); Chun-Wei Wu, Hsinchu (TW); Chung Sheng Wu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 543 days.

(21) Appl. No.: 16/361,335

(22) Filed: Mar. 22, 2019

(65) Prior Publication Data

US 2020/0148132 A1 May 14, 2020

(30) Foreign Application Priority Data

Nov. 14, 2018 (TW) .................................. 107140426

(51) Int. Cl.
*B60R 11/04* (2006.01)
*G01S 13/86* (2006.01)
*G01S 13/931* (2020.01)
*G01S 7/03* (2006.01)
*G02B 7/02* (2021.01)
(Continued)

(52) U.S. Cl.
CPC ................ *B60R 11/04* (2013.01); *G01S 7/03* (2013.01); *G01S 13/867* (2013.01); *G01S 13/931* (2013.01); *G02B 7/023* (2013.01); *B60R 1/00* (2013.01); *B60R 2011/004* (2013.01); *B60R 2011/0049* (2013.01);
(Continued)

(58) Field of Classification Search
CPC ........ G01S 7/03; G01S 13/867; G01S 13/931; G02B 7/023; B60R 11/04; B60R 1/00; B60R 2011/004; B60R 2011/0049; B60R 2300/802
See application file for complete search history.

(56) References Cited

U.S. PATENT DOCUMENTS 3,689,695 A * 9/1972 Rosenfield ................ B60R 1/00
348/148
9,989,835 B1 * 6/2018 Gomez .................... B60R 11/04
(Continued)

FOREIGN PATENT DOCUMENTS

CN 203946040 U 11/2014
CN 205781873 U * 12/2016 ............. B60R 11/02
(Continued)

*Primary Examiner* — Peter M Bythrow
(74) *Attorney, Agent, or Firm* — Bacon & Thomas, PLLC

(57) ABSTRACT

A blind-spot image device with adjustment rings is applicable to a vehicle and includes a housing and a camera module in addition to two adjustment rings, wherein the housing has an opening and is protrudingly provided with an extension portion corresponding in position to the opening; the rear half of the camera module extends into the opening; the front side of the camera module is provided with a lens element; and the adjustment rings are mounted around the camera module and hold the extension portion between them, with one adjustment ring lying outside the housing and the other adjustment ring inside the housing. The blind-spot image device is characterized in that the corresponding sides of the two adjustment rings are inclined, and that the shooting angle of the lens element can be changed by rotating the adjustment rings.

15 Claims, 5 Drawing Sheets

(51) Int. Cl.
  *B60R 11/00* (2006.01)
  *B60R 1/00* (2006.01)
  *G01S 7/02* (2006.01)
(52) U.S. Cl.
  CPC ......... *B60R 2300/802* (2013.01); *G01S 7/027* (2021.05); *G01S 2013/9315* (2020.01)

(56) References Cited

U.S. PATENT DOCUMENTS

| | | | | |
|---|---|---|---|---|
| 10,277,786 | B1* | 4/2019 | Leonelli, Jr. | H04N 5/2252 |
| 10,805,509 | B2* | 10/2020 | Fredriksson | G03B 17/02 |
| 10,855,897 | B2* | 12/2020 | Fredriksson | H04N 5/2257 |
| 2003/0103142 | A1* | 6/2003 | Hitomi | B60R 11/04 |
| | | | | 348/148 |
| 2005/0052757 | A1* | 3/2005 | Nishide | G02B 7/10 |
| | | | | 359/813 |
| 2006/0028548 | A1* | 2/2006 | Salivar | H04N 7/181 |
| | | | | 348/143 |
| 2009/0128687 | A1* | 5/2009 | Woo | B60R 13/105 |
| | | | | 348/373 |
| 2010/0103540 | A1* | 4/2010 | An | G02B 7/023 |
| | | | | 359/819 |
| 2010/0165100 | A1* | 7/2010 | Asai | B60R 1/06 |
| | | | | 348/135 |
| 2011/0109788 | A1* | 5/2011 | Santo | G02B 7/023 |
| | | | | 348/345 |
| 2011/0149077 | A1* | 6/2011 | Robert | B60R 1/12 |
| | | | | 348/148 |
| 2015/0258945 | A1* | 9/2015 | Schutz | G08B 13/19619 |
| | | | | 348/373 |
| 2015/0326760 | A1* | 11/2015 | Knutsson | H04N 5/2253 |
| | | | | 348/148 |
| 2015/0327398 | A1* | 11/2015 | Achenbach | H05K 7/2039 |
| | | | | 348/148 |
| 2015/0360619 | A1* | 12/2015 | Barthel | B60R 11/04 |
| | | | | 348/148 |
| 2016/0001330 | A1* | 1/2016 | Romack | H04N 5/2254 |
| | | | | 134/18 |
| 2016/0236558 | A1* | 8/2016 | Koseki | E05B 83/18 |
| 2016/0255251 | A1* | 9/2016 | Urano | G02B 7/023 |
| | | | | 348/143 |
| 2017/0186323 | A1* | 6/2017 | Atkin | B60R 1/00 |
| 2018/0009394 | A1* | 1/2018 | Okabe | B60R 1/12 |
| 2018/0134218 | A1* | 5/2018 | Lettis | H04N 5/2252 |
| 2018/0152605 | A1* | 5/2018 | Conger | H04N 5/2257 |
| 2018/0152609 | A1* | 5/2018 | Wang | H04N 5/235 |
| 2018/0195317 | A1* | 7/2018 | Okuma | H04N 7/183 |
| 2018/0224622 | A1* | 8/2018 | Han | G03B 17/12 |
| 2018/0255213 | A1* | 9/2018 | Ahn | B60R 1/00 |
| 2018/0287306 | A1* | 10/2018 | Grimes | G03B 17/02 |
| 2019/0100148 | A1* | 4/2019 | Iida | B60R 11/04 |
| 2019/0208093 | A1* | 7/2019 | Fredriksson | G03B 17/561 |
| 2019/0268514 | A1* | 8/2019 | Leonelli, Jr. | B60R 11/04 |
| 2020/0047689 | A1* | 2/2020 | Kaplan | B60R 11/04 |
| 2020/0192084 | A1* | 6/2020 | Bretagnol | B60S 1/0848 |
| 2020/0310069 | A1* | 10/2020 | Takeuchi | B60R 1/001 |
| 2021/0229605 | A1* | 7/2021 | Pan | F16B 2/005 |

FOREIGN PATENT DOCUMENTS

| | | |
|---|---|---|
| CN | 205781873 U | 12/2016 |
| TW | 201239503 A | 10/2012 |

* cited by examiner

BLIND-SPOT IMAGE DEVICE WITH ADJUSTMENT RINGS

FIELD OF THE INVENTION

The present invention relates to an image device and more particularly to one configured to take images of a vehicle's blind spots and having adjustment rings for adjusting the shooting angle of the lens of the image device so as to adapt the image device to different vehicle heights and mounting positions.

BACKGROUND OF THE INVENTION

Generally, a driver has a limited rear field of view, so when reversing, parking sensors are often relied on to verify if there is any obstacle behind the vehicle and, if there is, to determine the distance to the obstacle, the goal being to enhance the safety of reversing.

Nowadays, obstacle detection by a parking sensor is typically based on the principle of ultrasonic ranging and is carried out as follows. To begin with, a plurality of ultrasonic sensors are mounted at the back of a vehicle. The sensors can generate ultrasonic waves in order for an obstacle to reflect the waves, and when the sensors do receive such reflected waves, they send a sensing signal to a controller, which then calculates the distance between the vehicle and the obstacle and the position of the obstacle. If necessary, the controller will further drive a buzzer to make a warning sound. As an ultrasonic sensor can receive ultrasonic waves only within a certain angular range referred to as the "detection angle", which in most cases is 90 to 120 degrees in the horizontal direction and 60 to 80 degrees in the vertical direction, it is common practice to provide a vehicle with at least two ultrasonic sensors in order to reduce the blind spot detection area of each sensor, thereby enhancing the level of safety those sensors can provide.

As is well known in the art, the performance of an ultrasonic sensor is determined not only by its structure and material, but also by the intensity of reflected waves, which is associated with the propagation properties of ultrasonic waves. For example, an ultrasonic sensor can receive few, if any, reflected waves if the reflective side of an obstacle (i.e., the side facing the ultrasonic sensor) has a relatively small area, or if an obstacle has a smooth flat surface, is not in line with the ultrasonic sensor, or is made of a loose or porous material. Any of the foregoing scenarios may cause a parking sensor unable to accurately determine the existence of an obstacle behind the vehicle. Also, environmental factors such as ambient temperature, relative humidity, and atmospheric pressure may affect the intensity of reflected waves and thus compromise the detection effect of a parking sensor.

To compensate for the aforesaid shortcomings of parking sensors, some vehicles are additionally provided with a rear-view camera at the back so that, while reversing, an onboard display screen will simultaneously display the images captured by the camera to complement the warning of the parking sensors. With the assistance of such a camera and display screen, a driver still can directly see whatever is behind the vehicle and keep away from any obstacle that is shown on the display screen even when the ultrasonic sensors misjudge the situation behind the vehicle. However, the applicant of the present patent application has found that most rear-view cameras only have their housing locked to an automotive component (e.g., the base of a side-view mirror, or the rear bumper); the lens itself does not have any fixing structure. While this configuration makes it easier for a user to adjust the angle of the lens, the lens may deviate from the predetermined angle after long-term use, as a result of driving over bumpy roads for example. Should such deviation take place, it is necessary to adjust the angle of the lens before reversing, which causes inconvenience in use and works against the purpose of installing the camera as an auxiliary device. If, on the other hand, the lens is fixed at a certain angle, it will be required to produce rear-view cameras whose shooting angles are designed respectively for different vehicle models, simply considering the fact that the dimensions, heights, appearances, and so on of automotive components tend to vary from one model to another. Nevertheless, the production of custom-made rear-view cameras for various vehicle models is extremely difficult, if not impractical. The issue to be addressed by the present invention, therefore, is to improve the conventional rear-view cameras (or image devices) structurally and thereby solve the problems mentioned above.

BRIEF SUMMARY OF THE INVENTION

In view of the fact that the shooting angle of a conventional rear-view camera (or image device) generally needs to be adjusted according to the model of the vehicle where the camera (or image device) is mounted in order to monitor the blind spots of the vehicle effectively, and that a simpler structure and adjustment mechanism have yet to be devised, the inventor of the present invention conducted extensive research and repeated experiments and finally succeeded in developing a blind-spot image device with adjustment rings as an effective solution to the aforementioned problems.

One objective of the present invention is to provide a blind-spot image device having adjustment rings. The blind-spot image device is designed for use in a vehicle and includes a housing, a camera module, a first adjustment ring, and a second adjustment ring. The housing is configured to be fixed on an automotive component exposed on the outer surface of the vehicle, is formed with an opening, is protrudingly provided with an extension portion corresponding in position to the opening, and has an internal accommodating space that communicates with the opening. The rear half of the camera module extends into the opening. A lens element is provided on the front side of the camera module. The first adjustment ring is mounted around the camera module at a position adjacent to the lens element and outside the housing, and has one side abutting against the outer side of the extension portion. The second adjustment ring is also mounted around the camera module but lies inside the housing. The side of the second adjustment ring that corresponds to the first adjustment ring abuts against the inner side of the extension portion. Consequently, the extension portion is clamped between the second adjustment ring and the first adjustment ring. The present invention is characterized in that the aforesaid side of the first adjustment ring is inclined, that the aforesaid side of the second adjustment ring is also inclined, and that therefore the shooting angle of the lens element can be changed by rotating the first adjustment ring and the second adjustment ring.

BRIEF DESCRIPTION OF THE SEVERAL VIEWS OF THE DRAWINGS

The objectives, technical features, and effects of the present invention can be better understood by referring to the following detailed description of some illustrative embodiments and the accompanying drawings, in which.

DETAILED DESCRIPTION OF THE INVENTION

Figure 1:
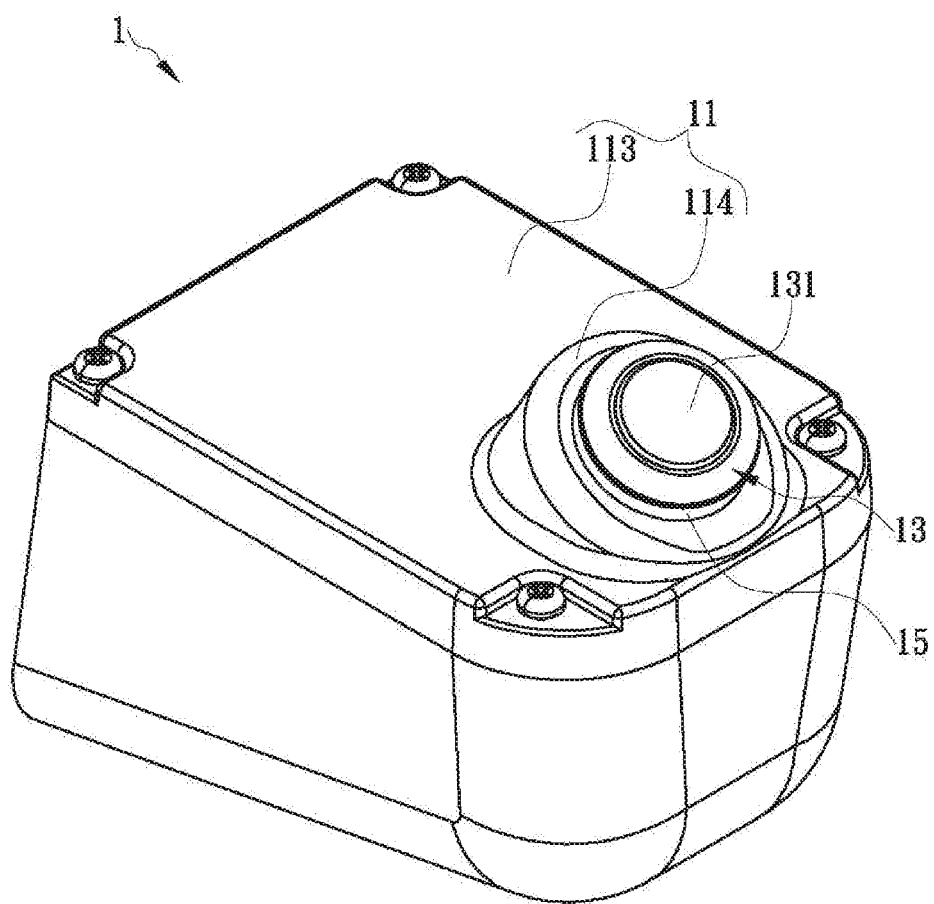
FIG. 1 is a perspective view of a blind-spot image device according to the present invention.

The present invention provides a blind-spot image device having adjustment rings. According to an embodiment as shown in FIG. 1, the blind-spot image device 1 is configured to be mounted on an automotive component exposed on the outer surface of a vehicle, such as the base of a side-view mirror, the rear bumper, or the top of the vehicle. The blind-spot image device 1 serves mainly to take images of the blind spots of the vehicle, i.e., areas that a driver of the vehicle cannot see directly or in the rear-, left-, or right-view mirror. Please note that the exterior design of the blind-spot image device 1 is not limited to that shown in FIG. 1 and may be adjusted according to product requirements.

Figure 2:
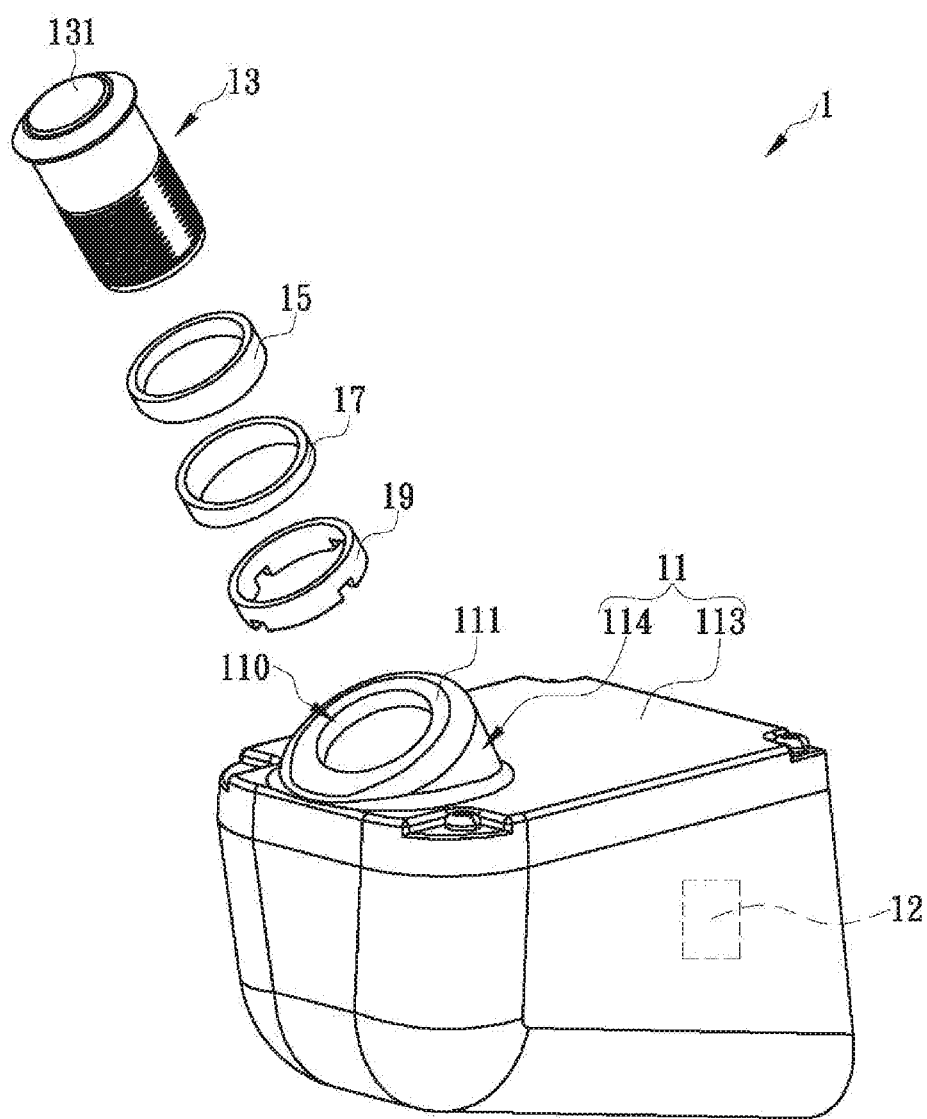
FIG. 2 is an exploded view of the blind-spot image device in FIG. 2.
Figure 3:
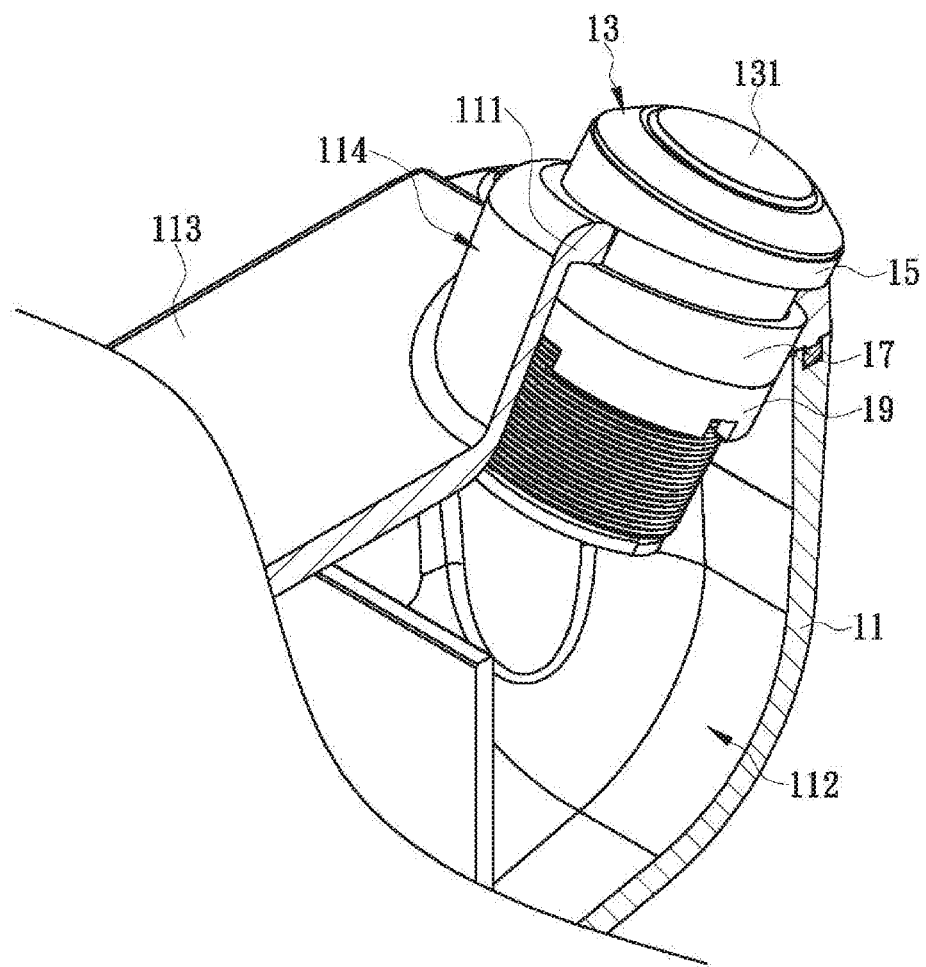
FIG. 3 is a partial sectional view of the blind-spot image device in FIG. 2.

As shown in FIG. 1 to FIG. 3, the blind-spot image device 1 includes a housing 11, a camera module 13, a first adjustment ring 15, and a second adjustment ring 17. The housing 11 is configured to be fixed on the aforesaid automotive component and is formed with an opening 110. Also, the housing 11 is protrudingly provided with an extension portion 111 corresponding in position to the opening 110, wherein the extension portion 111 extends toward the center of the circle defined by the opening 110 (or the axis of the opening 110). An accommodating space 112 is provided in the housing 11 to accommodate the necessary components of the blind-spot image device 1. The accommodating space 112 is in communication with the opening 110. In this embodiment, one side of the housing 11 is provided with a flat area 113 and is protrudingly provided with a protruding portion 114. The protruding portion 114 and the flat area 113 form an included angle θ1 (see FIG. 4), and the included angle θ1 is larger than 90 degrees (by way of example but not limitation). The opening 110 is located at the free end of the protruding portion 114. In other embodiments of the present invention, however, the protruding portion 114 may be dispensed with or modified in shape to meet product requirements.

With continued reference to FIG. 1 to FIG. 3, the rear half of the camera module 13 is configured to extend into the opening 110, and the front side of the camera module 13 is provided with a lens element 131. It should be pointed out that cables related to the camera module 13 (e.g., the power cable and the image transmission cable) are omitted from the drawings for the sake of simplicity. The camera module 13 in the present invention can be any camera module provided that it can take images of the surroundings and send the images to a predetermined device in the vehicle (e.g., an onboard computer). The first adjustment ring 15 is mounted around the camera module 13 at a position adjacent to the lens element 131 and outside the housing 11. The first adjustment ring 15 has one side abutting against the outer side of the extension portion 111. The second adjustment ring 17 is mounted around the camera module 13 at a position adjacent to the rear half of the camera module 13 and inside the housing 11. One side of the second adjustment ring 17 that corresponds to the first adjustment ring 15 abuts against the inner side of the extension portion 111. The extension portion 111, therefore, is clamped between the second adjustment ring 17 and the first adjustment ring 15 (see FIG. 4) to fix the camera module 13 on the housing 11 and prevent the camera module 13 from separating from the housing 11. In this embodiment, the first adjustment ring 15 and the second adjustment ring 17 are made of metal in order to be highly durable and robust; in other embodiments, the adjustment rings may be made of other materials instead.

Figure 4:
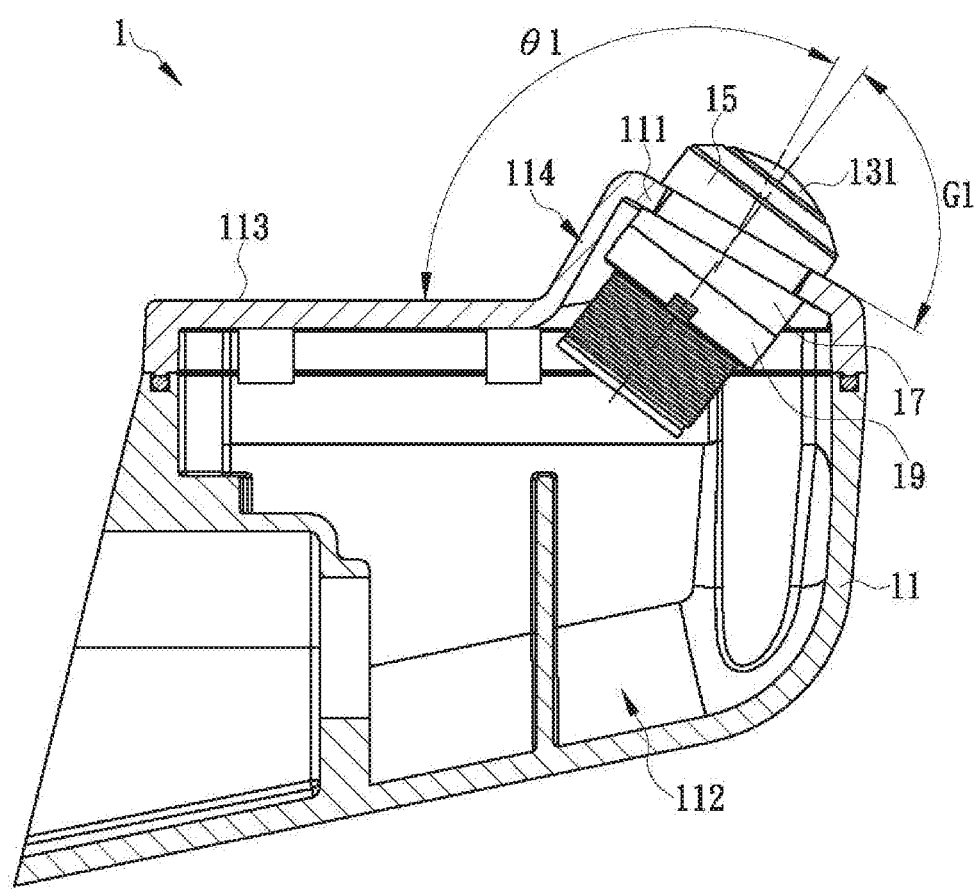
FIG. 4 shows a shooting angle of the blind-spot image device in FIG. 2.
Figure 5:
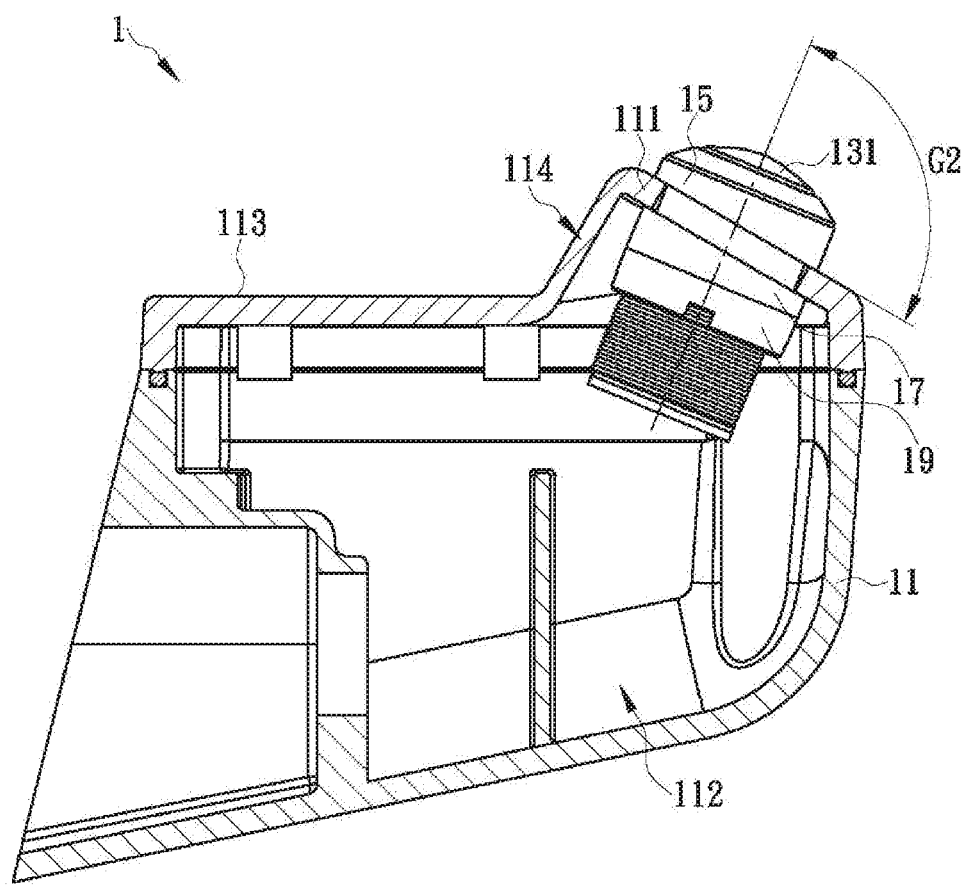
FIG. 5 shows another shooting angle of the blind-spot image device in FIG. 2.

In this embodiment, referring again to FIG. 1 to FIG. 3, the aforesaid side of the first adjustment ring 15 is inclined such that the peripheral wall of the first adjustment ring 15 does not have a uniform height. For example, the first adjustment ring 15 is shown in FIG. 3 as having a smaller thickness on the right than on the left. The aforesaid side of the second adjustment ring 17 is also inclined such that the peripheral wall of the second adjustment ring 17 does not have a uniform height, either. By rotating the first adjustment ring 15 and the second adjustment ring 17 as shown in FIG. 4 and FIG. 5, the camera module 13 can be fine-tuned in position with respect to the housing 11, and the shooting angle of the lens element 131 will be changed as a result. For example, by rotating the first adjustment ring 15 from the position shown in FIG. 4, in which the first adjustment ring 15 has a smaller thickness on the right than on the left, to the position shown in FIG. 5, in which the first adjustment ring 15 has a greater thickness on the right than on the left, the angle G1 in FIG. 4 is increased to the angle G2 in FIG. 5. In the meantime, the second adjustment ring 17 is rotated in the same direction as the first adjustment ring 15 to keep the camera module 13 mounted securely on the housing 11. Therefore, once the blind-spot image device 1 is mounted on the vehicle, the shooting angle of the lens element 131 can be rapidly and easily adjusted by rotating the first adjustment ring 15 and the second adjustment ring 17, allowing the camera module 13 to take images of the blind spots of the vehicle effectively. According to the above, the blind-spot image device 1 of the present invention can adapt to various vehicle models, does not require a complicated mounting process, and hence features great convenience in installation and use.

In addition, referring back to FIG. 2 and FIG. 3, a fixing portion 19 is mounted around the camera module 13 to ensure that the first adjustment ring 15 and the second adjustment ring 17 will clamp the extension portion 111 securely between them without getting loose. The fixing portion 19 is in the housing 11 and has one side abutting against the side of the second adjustment ring 17 that faces away from the first adjustment ring 15, thereby keeping the second adjustment ring 17 in position (i.e., between the extension portion 111 and the fixing portion 19) and preventing the second adjustment ring 17 from separating from the camera module 13. In this embodiment, the fixing portion 19 is a nut, and the camera module 13 is provided with an external thread so that the nut can be connected threadedly to the camera module 13 and press tightly against the second adjustment ring 17.

Referring to FIG. 1 and FIG. 2, the blind-spot image device 1 further includes a radar module 12 located in the housing 11 and corresponding in position to the flat area 113. As the included angle θ1 of the structure formed by the flat area 113 and the protruding portion 114 allows the radar module 12 to emit and receive radar beams over a wide angle, effective detection by the radar module 12 is ensured. That is to say, the blind-spot image device 1 of the present invention can be integrated with a conventional parking sensor to provide radar sensing as well as image monitoring and therefore has high industrial applicability.

While the invention herein disclosed has been described by means of specific embodiments, numerous modifications and variations could be made thereto by those skilled in the art without departing from the scope of the invention set forth in the claims.

What is claimed is:

1. A blind-spot image device with adjustment rings, wherein the blind-spot image device is applicable to a vehicle and comprises:
   - a housing to be fixed on an automotive component exposed on an outer surface of the vehicle, wherein the housing is formed with an opening, is protrudingly provided with an extension portion corresponding in position to the opening, and is provided therein with an accommodating space that is in communication with the opening;
   - a camera module at least a rear half of which extends into the opening, wherein the camera module has a front side provided with a lens element;
   - a first adjustment ring mounted around the camera module at a position adjacent to the lens element and outside the housing, wherein the first adjustment ring has a side abutting against an outer side of the extension portion; and
   - a second adjustment ring mounted around the camera module at a position inside the housing, wherein the second adjustment ring has a side corresponding to the first adjustment ring and abutting against an inner side of the extension portion such that the extension portion is clamped between the second adjustment ring and the first adjustment ring;
   - the blind-spot image device being characterized in that: the side of the first adjustment ring is inclined, the side of the second adjustment ring is also inclined, and a shooting angle of the lens element is adjustable by rotating the first adjustment ring and the second adjustment ring.

2. The blind-spot image device of claim 1, further comprising a fixing portion, wherein the fixing portion is mounted around the camera module at a position inside the housing, and the fixing portion has a side abutting against an opposite side of the second adjustment ring to keep the second adjustment ring in position.

3. The blind-spot image device of claim 2, wherein the camera module is provided with an external thread, and the fixing portion is a nut screwed onto the camera module.

4. The blind-spot image device of claim 1, wherein both the first adjustment ring and the second adjustment ring are made of metal.

5. The blind-spot image device of claim 2, wherein both the first adjustment ring and the second adjustment ring are made of metal.

6. The blind-spot image device of claim 3, wherein both the first adjustment ring and the second adjustment ring are made of metal.

7. The blind-spot image device of claim 4, wherein the housing has a side provided with a flat area and protrudingly provided with a protruding portion, the protruding portion and the flat area form an included angle, and the opening is located at a free end of the protruding portion.

8. The blind-spot image device of claim 5, wherein the housing has a side provided with a flat area and protrudingly provided with a protruding portion, the protruding portion and the flat area form an included angle, and the opening is located at a free end of the protruding portion.

9. The blind-spot image device of claim 6, wherein the housing has a side provided with a flat area and protrudingly provided with a protruding portion, the protruding portion and the flat area form an included angle, and the opening is located at a free end of the protruding portion.

10. The blind-spot image device of claim 7, wherein the protruding portion has an axis forming an included angle larger than 90 degrees with the flat area.

11. The blind-spot image device of claim 8, wherein the protruding portion has an axis forming an included angle larger than 90 degrees with the flat area.

12. The blind-spot image device of claim 9, wherein the protruding portion has an axis forming an included angle larger than 90 degrees with the flat area.

13. The blind-spot image device of claim 10, further comprising a radar module, wherein the radar module is inside the housing and corresponds in position to the flat area.

14. The blind-spot image device of claim 11, further comprising a radar module, wherein the radar module is inside the housing and corresponds in position to the flat area.

15. The blind-spot image device of claim 12, further comprising a radar module, wherein the radar module is inside the housing and corresponds in position to the flat area.

* * * * *